No. 652,918. Patented July 3, 1900.
J. H. MUCKERHEIDE.
CHAIN REPAIR LINK.
(Application filed Sept. 23, 1899.)
(No Model.)
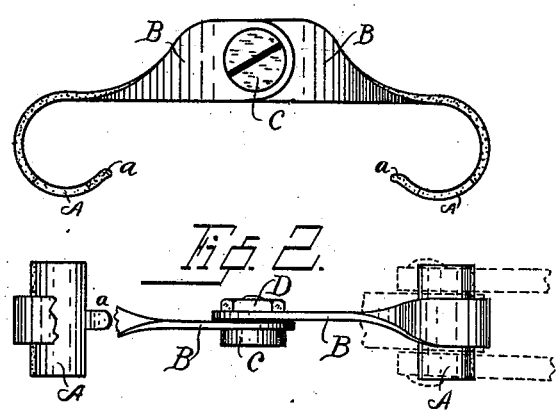
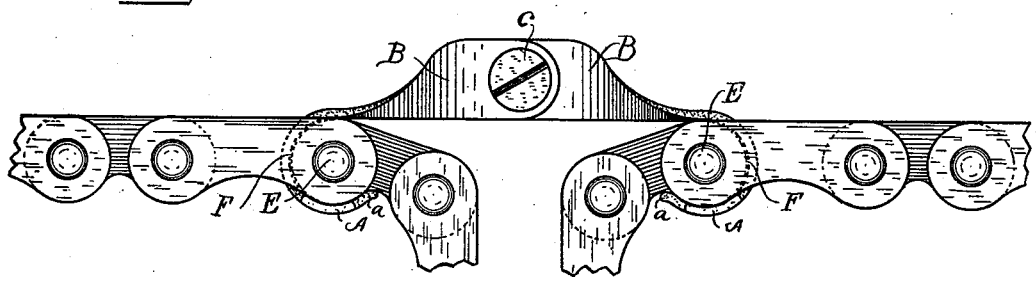
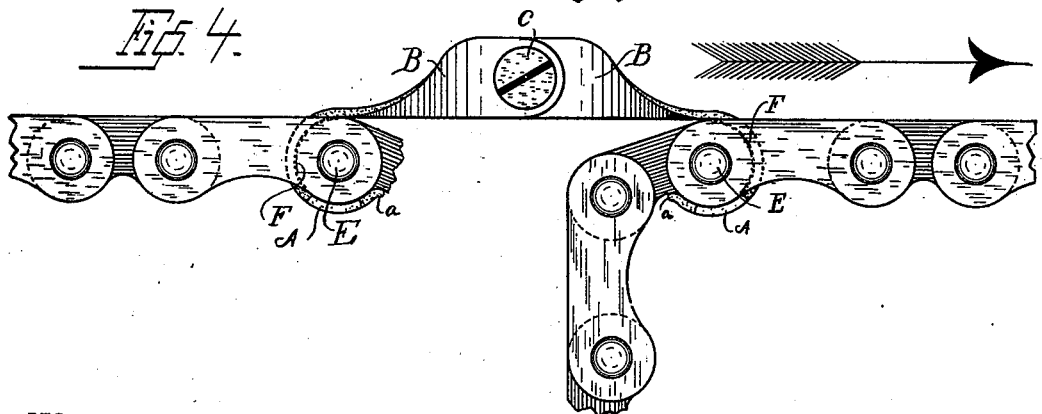
Witnesses.
Inventor.
Joseph H. Muckerheide
By Erwin Wheeler & Wheeler
Attorneys

UNITED STATES PATENT OFFICE.

JOSEPH H. MUCKERHEIDE, OF NORTH MILWAUKEE, WISCONSIN, ASSIGNOR TO EDWIN F. VAN VECHTEN, OF MILWAUKEE, WISCONSIN.

CHAIN-REPAIR LINK.

SPECIFICATION forming part of Letters Patent No. 652,918, dated July 3, 1900.

Application filed September 23, 1899. Serial No. 731,381. (No model.)

*To all whom it may concern:*

Be it known that I, JOSEPH H. MUCKERHEIDE, a citizen of the United States, residing at North Milwaukee, in the county of Milwaukee and State of Wisconsin, have invented new and useful Improvements in Chain-Repair Links, of which the following is a specification.

My invention relates to improvements in chain-repair links for sprocket-chains.

The object of my invention is to provide a form of device adapted to temporarily unite the parts of a broken chain, whereby the same may be easily and quickly repaired and used pending a convenient time and place for effecting permanent repairs.

In the following description reference is had to the accompanying drawings, in which—

Figure 1 is a side view of my invention. Fig. 2 is a top view of the same, with dotted lines indicating the position of the link-bars of the bicycle-chain when my invention is in use. Fig. 3 is a side view showing my invention as it is applied to a chain having one of its links broken. Fig. 4 is a similar view showing the application of my invention where one of the blocks is broken.

Like parts are identified by the same reference-letters throughout the several views.

My device is formed with two hook-shaped members adapted to be secured together by a hinge-joint, as hereinafter explained. Each member is formed of a flat piece of metal, having a cross-bar A at one end, this end being bent or curved to form the hook. The other end B, which forms a shank for the hook, is twisted, as shown in the drawings, so that the flat surfaces of the shank ends will meet in a plane perpendicular to that of the chain. These ends are therefore easily secured together by a bolt C and nut D, so as to form a hinge-joint.

When the members of my device are separated, the shanks may be easily inserted in the links of a sprocket-chain and drawn through until the hook-shaped extremities engage around the rivet E or around the rounded end F of the block engaged thereby, with the cross-bars A engaging the side bars of the link and preventing the hooks from disengaging. Where the chain is broken, it is therefore obvious that the respective members of my device may be inserted through the sound links on each side of the fracture, the shanks being brought together over the broken link or block and united by the bolt C and nut D, the chain being thus easily and quickly repaired without tools other than a wrench, and even this may be dispensed with, if necessary, as the nut D can be turned on by hand for temporary use. The respective members of the repair-links are formed of such a width that the device can be used on sprocket-chains of various sizes, it being merely necessary that the shanks should be narrow enough to permit their insertion in the links. It is also obvious that my device is adapted to be used in case either a link or a block is broken, and owing to the joint formed by the bolt C the chain will pass around the sprocket-wheels without cramping. The outer end of the cross-bar A is preferably formed with a slight tongue or extension $a$, as shown in the drawings, so as to hold up the end of a broken block and prevent the same from catching on the sprocket-wheel. Where a block is broken, the repaired chain should be placed upon the sprocket-wheels in such a manner that the free link will follow over the sprocket-wheels, as indicated in Fig. 4, although, if desired, one of the members of the repair-link may be inserted through this link, thus slightly lengthening the chain, as my device is preferably adapted to reach over two blocks and one link in order that it may be used to repair a break in either.

Having thus described my invention, what I claim as new, and desire to secure by Letters Patent, is—

1. A repair-link for sprocket-chains, comprising two hook-shaped members provided with shanks adapted to be inserted through the links of a sprocket-chain; and having cross-bars on the hooked ends of said members, adapted to engage the side bars of the chain-links; and means for uniting the shanks of the members to form a hinge-joint.

2. A repair-link for sprocket-chains, comprising two hook-shaped members provided with shanks adapted to be inserted through the links of a sprocket-chain; and having cross-bars on the hooked ends of said members, adapted to engage the side bars of the chain-links; and also provided with tongues extending from the outer edges of the cross-bars; and means for uniting the shanks of the members to form a hinge-joint.

3. A repair-link for sprocket-chains, comprising two hook-shaped members, provided with shanks adapted to be inserted through the links of a sprocket-chain, the ends of the shanks being twisted so that their flat surfaces are adapted to meet in a plane perpendicular to that of the chain, the hooked ends of the members having cross-bars, adapted to engage the side bars of the chain-links; and a bolt and nut for securing the meeting ends of the shanks together in the form of a hinge-joint.

In testimony whereof I have hereunto set my hand this 12th day of September, 1899.

JOSEPH H. MUCKERHEIDE.

Witnesses:
LEVERETT C. WHEELER,
F. A. OTTO.